US012209731B2

(12) United States Patent
Large et al.

(10) Patent No.: US 12,209,731 B2
(45) **Date of Patent: *Jan. 28, 2025**

(54) LIGHT FIXTURE FOR CEILING GRID

(71) Applicant: ABL IP Holding LLC, Atlanta, GA (US)

(72) Inventors: Dominic Matthew Large, Broomfield, CO (US); Ryan Matthew Walker, Montreal (CA); Carl T. Gould, Golden, CO (US); Zachary Adam Ingalls, Littleton, CO (US); Christopher Jay Sorensen, Arvada, CO (US); Dirk Zylstra, Montreal (CA); Alexis Rondeau, Montreal (CA); Joshua Jeremy Miller, Littleton, CO (US)

(73) Assignee: ABL IP Holding LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/593,266

(22) Filed: Mar. 1, 2024

(65) Prior Publication Data

US 2024/0200738 A1 Jun. 20, 2024

Related U.S. Application Data

(63) Continuation of application No. 17/899,045, filed on Aug. 30, 2022, now Pat. No. 11,940,121.

(51) Int. Cl.

| | |
|---|---|
| ***F21S 8/02*** | (2006.01) |
| ***F21V 7/05*** | (2006.01) |
| ***F21V 21/04*** | (2006.01) |

(52) U.S. Cl.
CPC ................ *F21S 8/026* (2013.01); *F21V 7/05* (2013.01); *F21V 21/041* (2013.01)

(58) Field of Classification Search
CPC ........... F21S 8/026; F21V 7/05; F21V 21/041
See application file for complete search history.

(56) References Cited

U.S. PATENT DOCUMENTS

| | | | |
|---|---|---|---|
| 2,737,577 | A | 3/1956 | Mcphail |
| 4,081,665 | A | 3/1978 | Corbeil |
| 4,268,897 | A | 5/1981 | Schierwagen et al. |

(Continued)

FOREIGN PATENT DOCUMENTS

| | | | |
|---|---|---|---|
| DE | 102012006887 | A1 | 10/2012 |
| EP | 1843084 | B1 | 12/2008 |

(Continued)

OTHER PUBLICATIONS

"Bounce AE", Nulite Lighting, Available Online at: https://www.nulite-lighting.com/products/bounce, 2014, 3 pages.

(Continued)

*Primary Examiner* — Christopher E Dunay
(74) *Attorney, Agent, or Firm* — Kilpatrick Townsend & Stockton LLP

(57) ABSTRACT

A lighting system for a ceiling grid system may provide lighting at a location below the ceiling grid system. The light fixture includes a light source and a support member, and the light fixture may provide diffusely reflected light to a ceiling grid opening. The light fixture may include a wall assembly that is adapted to be moved between a folded configuration and an unfolded configuration.

20 Claims, 13 Drawing Sheets

(56) References Cited

U.S. PATENT DOCUMENTS

| | | | |
|---|---|---|---|
| 4,338,653 | A | 7/1982 | Marrero |
| 4,517,631 | A | 5/1985 | Mullins |
| 4,933,820 | A | 6/1990 | Engel |
| 5,823,663 | A | 10/1998 | Bell et al. |
| 6,210,025 | B1 | 4/2001 | Schmidt et al. |
| 6,789,914 | B1 | 9/2004 | Brown et al. |
| 7,178,946 | B2 | 2/2007 | Saccomanno et al. |
| 7,213,940 | B1 | 5/2007 | Van De Ven et al. |
| 7,232,239 | B2 | 6/2007 | Zucker |
| 7,387,410 | B2 | 6/2008 | Sibout |
| 7,768,192 | B2 | 8/2010 | Van De Ven et al. |
| D664,699 | S | 7/2012 | Nakahira et al. |
| 8,220,955 | B2 | 7/2012 | Kwak et al. |
| 8,425,101 | B2 | 4/2013 | Boonekamp |
| 8,523,383 | B1 | 9/2013 | Grigore et al. |
| 8,674,616 | B2 | 3/2014 | Holman et al. |
| 9,206,948 | B1 | 12/2015 | Scribante et al. |
| 9,316,368 | B2 | 4/2016 | Pickard et al. |
| 9,551,482 | B2 | 1/2017 | Seward et al. |
| D779,699 | S | 2/2017 | Bernard et al. |
| 9,874,333 | B2 | 1/2018 | Lay et al. |
| 9,967,928 | B2 | 5/2018 | Harris |
| 10,203,088 | B2 | 2/2019 | Lay et al. |
| 10,492,263 | B2 | 11/2019 | Miller et al. |
| 10,690,305 | B2 | 6/2020 | Bernard et al. |
| 10,883,702 | B2 | 1/2021 | Edmond et al. |
| 11,079,076 | B2 | 8/2021 | Bernard et al. |
| 11,428,373 | B2 | 8/2022 | Bernard et al. |
| 2003/0210546 | A1 | 11/2003 | Chin |
| 2008/0278945 | A1 | 11/2008 | Venhaus |
| 2010/0135020 | A1 | 6/2010 | Moore et al. |
| 2011/0096544 | A1 | 4/2011 | Nakamura |
| 2011/0219718 | A1 | 9/2011 | Gerkes et al. |
| 2012/0051041 | A1 | 3/2012 | Edmond et al. |
| 2012/0262902 | A1 | 10/2012 | Pickard et al. |
| 2012/0327650 | A1 | 12/2012 | Lay et al. |
| 2013/0250567 | A1 | 9/2013 | Edmond et al. |
| 2013/0294053 | A1 | 11/2013 | Marquardt et al. |
| 2013/0335962 | A1 | 12/2013 | Wu et al. |
| 2014/0003047 | A1 | 1/2014 | Shimizu |
| 2014/0146542 | A1 | 5/2014 | Seward et al. |
| 2014/0167065 | A1 | 6/2014 | Bergmann et al. |
| 2014/0265930 | A1 | 9/2014 | Harris |
| 2014/0268721 | A1 | 9/2014 | Durkee et al. |
| 2014/0268748 | A1 | 9/2014 | Lay et al. |
| 2015/0233533 | A1 | 8/2015 | Van Es |
| 2016/0061413 | A1* | 3/2016 | Hedberg, Jr. ............. F21V 7/06 362/147 |

FOREIGN PATENT DOCUMENTS

| | | | |
|---|---|---|---|
| EP | 2650599 | A1 | 10/2013 |
| EP | 2339227 | B1 | 8/2017 |
| JP | 4016542 | B2 | 12/2007 |

OTHER PUBLICATIONS

"Chisel™", Shape your Lighting Experience with Ease, Mark Architectural Lighting, Available Online at: https://marklighting.acuitybrands.com/products/family/chisel, 2022, 4 pages.
"EC Coffered Ceiling System", Aug. 30, 2022, 2 pages.
"Reflections: Recessed Decorative LED Downlights", Tech Lighting, Available Online at: http://www.element-lighting.com/Why-Element/Reflections-Decorative-Downlights, Accessed from Internet on Oct. 28, 2022, 5 pages.
"Vault™ 2x2", Focal Point LLC, Dec. 2016, 3 pages.
U.S. Appl. No. 17/899,045, "Advisory Action", Sep. 29, 2023, 3 pages.
U.S. Appl. No. 17/899,045, "Final Office Action", Jul. 13, 2023, 11 pages.
U.S. Appl. No. 17/899,045, "Non-Final Office Action", Dec. 27, 2022, 11 pages.
U.S. Appl. No. 17/899,045, "Notice of Allowance", Nov. 20, 2023, 8 pages.

* cited by examiner

LIGHT FIXTURE FOR CEILING GRID

CROSS-REFERENCE TO RELATED APPLICATION

This application is a continuation of U.S. application Ser. No. 17/899,045, filed on Aug. 30, 2022, which is hereby incorporated by reference in its entirety for all purposes.

FIELD OF THE INVENTION

This application relates to light fixtures, and more particularly to light fixtures used with ceiling grid systems.

BACKGROUND

Some architectural spaces feature ceiling grid systems, in which grid elements (commonly referred to as T-grids) are suspended from an actual ceiling so as to create grid openings that receive ceiling tiles. The grid elements and ceiling tiles collectively create a faux ceiling below the actual ceiling. Lighting to illuminate the space below the faux ceiling can be provided by suspending light fixtures from the ceiling or by providing light fixtures within the grid openings. Traditional light fixtures for ceiling grid systems are large and have a substantial shipping impact, resulting in higher costs and carbon emissions. Traditional light fixtures are also formed from materials that have poor acoustical performance and that appear different than the ceiling tiles around the light fixture, thus creating a discontinuity in appearance across the ceiling. Traditional light fixtures for ceiling grid systems may also be cumbersome to assemble and/or install on site.

SUMMARY

Embodiments covered by this patent are defined by the claims below, not this summary. This summary is a high-level overview of various embodiments and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain embodiments, a light fixture for a ceiling grid system includes a support member and a light source. The light fixture may provide indirect lighting. A light engine assembly of the light fixture may provide an asymmetric, batwing light distribution.

According to various embodiments, a light fixture for a ceiling grid system includes a light engine assembly with a support member and a light source. The light fixture also includes a monolithic wall assembly that extends at least partially around a ceiling opening in the ceiling grid system. The monolithic wall assembly may be adjustable between a folded configuration and an unfolded configuration.

Various implementations described herein may include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The specification makes reference to the following appended figures, in which use of like reference numerals in different figures is intended to illustrate like or analogous components.

DETAILED DESCRIPTION

Described herein are light fixtures for ceiling grid systems. The light fixtures described herein may be modular to accommodate various grid sizes as needed. In certain embodiments, the light fixtures described herein are collapsible and expandable, and the light fixtures may be assembled on a ceiling grid without requiring tools. The light fixtures described herein may include acoustic materials such that the light fixtures have improved, consistent acoustic performance compared to traditional light fixtures. Additionally, or alternatively, the light fixtures described herein may provide improved visual aesthetics compared to traditional fixtures by utilizing a same ceiling tile as the rest of the ceiling for a luminous area (or any other ceiling tile as desired). Light fixtures described herein may include an improved light engine assembly with a support, reflector, light source, and lens. Various other benefits and advantages may be realized with the systems and methods provided herein, and the aforementioned advantages should not be considered limiting.

Figure 1:
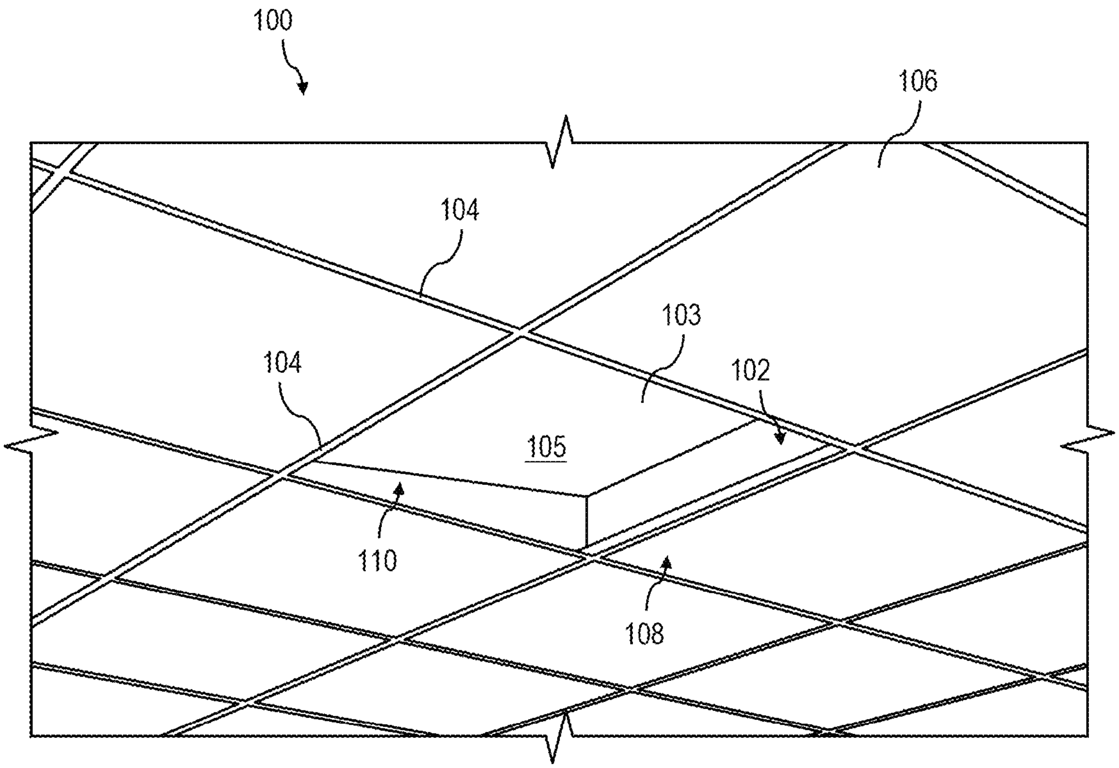
FIG. 1 illustrates a ceiling grid system with a light fixture according to embodiments.
Figure 2:
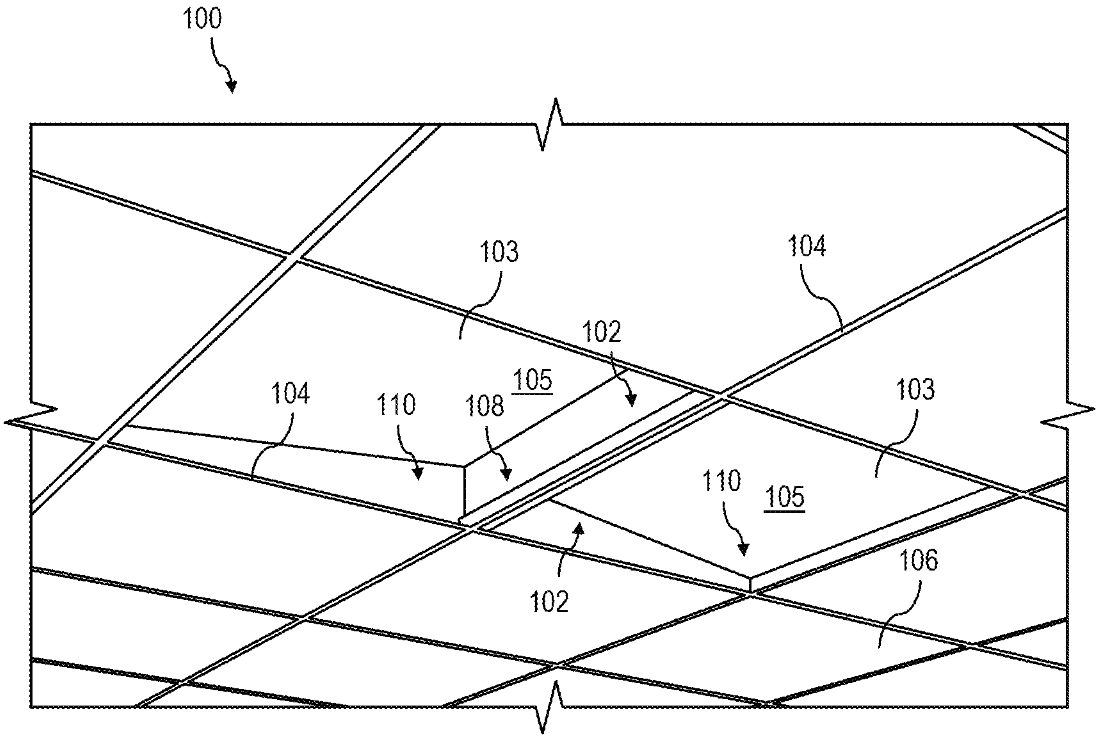
FIG. 2 illustrates a ceiling grid system with two of the light fixtures of FIG. 1.

FIGS. 1 and 2 illustrate a ceiling grid system 100 with one or more light fixtures 102 according to embodiments.

Figure 3:
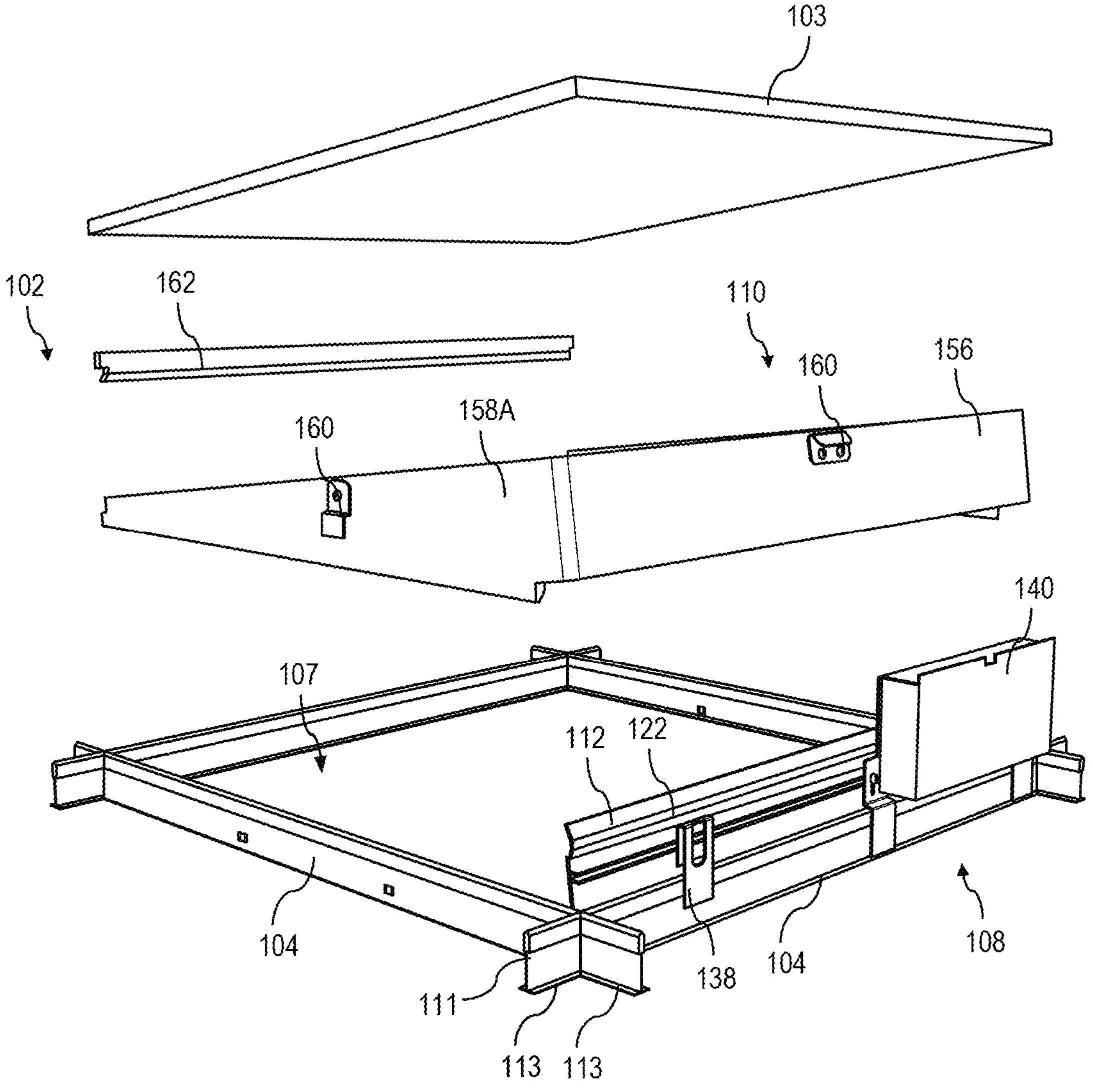
FIG. 3 illustrates an exploded view of a lighting system with the light fixture of FIG. 1 and a reflective tile according to embodiments.

The ceiling grid system 100 generally includes one or more grid sections 104 (also referred to as "T-grid sections") that define ceiling grid openings 107. One or more ceiling panels or tiles 106 are supported in the ceiling grid openings 107 at a location suspended below an existing ceiling or support system. In some embodiments, and referring to FIG. 3, the grid sections 104 have an upside-down T-shape cross-section formed by a vertical grid wall 111 and lateral grid flanges 113 that extend outwardly from the vertical wall 111. The grid sections 104 form ceiling grid openings 107 into which the ceiling tiles 106 are positioned and supported. The ceiling grid openings 107 formed by the grid sections 104 may be in various dimensions, with 2 ft.×2 ft. or 2 ft.×4 ft. being common dimensions of such openings. The particular ceiling grid system 100 illustrated, including its dimensions, should not be considered limiting.

The ceiling grid system 100 may include one or more lighting systems, and the lighting systems may be provided in various arrangements and orientations as desired. As discussed in detail below, the lighting systems may include a light fixture 102 and a reflective top or tile 103. In some embodiments, the reflective tile 103 may be a ceiling tile 106, although in other embodiments it need not be, and instead may be other tops or tiles constructed from any type of material that is able to reflect light. As a non-limiting example, the reflective tile 103 may be a plate covered with a highly reflective material.

FIG. 1 illustrates the ceiling grid system 100 with a lighting system having a single light fixture 102 positioned along the edges of a ceiling grid opening 107, and FIG. 2 illustrates the ceiling grid system 100 with the lighting system having two light fixtures 102 positioned along edges of adjacent ceiling grid openings 107. Other arrangements of lighting systems and/or light fixtures 102 may be utilized as desired in an installation.

In certain embodiments, each light fixture 102 supports a corresponding reflective tile 103 such that a luminous area 105 is defined on the reflective tile 106. In certain embodiments, and as discussed in detail below, the supported reflective tile 103 may be considered a reflector of the lighting system. In various embodiments and as discussed in detail below, the light fixtures 102 are designed to emit light upwardly and outwardly from light sources of the light fixtures 102 toward the reflective tile 103 to illuminate the surface of the reflective tile 103 and optionally towards the wall assembly 110. In some embodiments, all of light emitted from light sources of the light fixtures 102 is directed toward the reflective tile 103 and/or the wall assembly 110 to provide diffusely reflected light to the space. In some embodiments, the light fixture 102 is designed to prevent direct downlight from the light sources of the light fixtures 102. Stated differently, at a location below the ceiling grid system 100, the light sources of the light fixtures 102 according to some embodiments are "hidden" and not directly visible; rather, the light from the light sources is directed at least partially onto a corresponding reflective tile 103. In various embodiments, other components of the light engine assembly of the light fixture (e.g., reflector, optional lens, etc.) may likewise be hidden when the light fixture 102 is viewed from the ground or other location below the light fixture 102. As mentioned, while the reflective tiles 103 illuminated by the light fixtures 102 can be identical to the ceiling tiles 106 used in the remaining ceiling grid openings 107, they need not be. Rather, the reflective tiles 103 may be any type of tile or top made from any type of material that is able to reflect light. In some embodiments, the reflective tile 103 are substantially planar.

Referring to FIGS. 3-15B, each light fixture 102 includes a light engine assembly 108 and a wall assembly 110. In various embodiments, the wall assembly 110 is at least partially supported by the light engine assembly 108, as described in further detail below.

The light engine assembly 108 includes a support member 112 and a light engine 131.

The light engine 131 includes one or more light sources 114 and one or more optical components. Non-limiting examples of optical components of the light engine 131 include, but are not limited to, a reflector 116 and/or optionally a lens 118.

Figure 5:
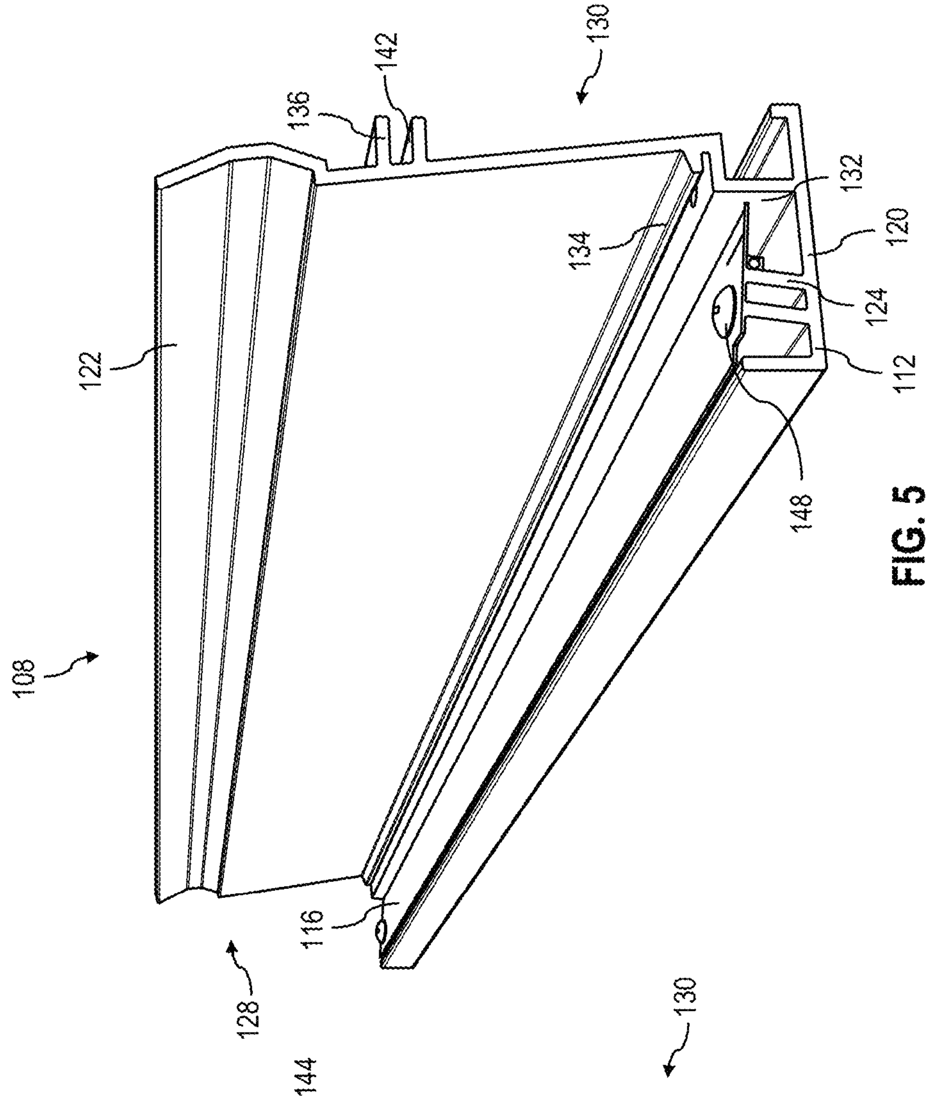
FIG. 5 illustrates the support frame and a reflector of the light engine assembly of FIG. 1 according to embodiments.
Figure 4:
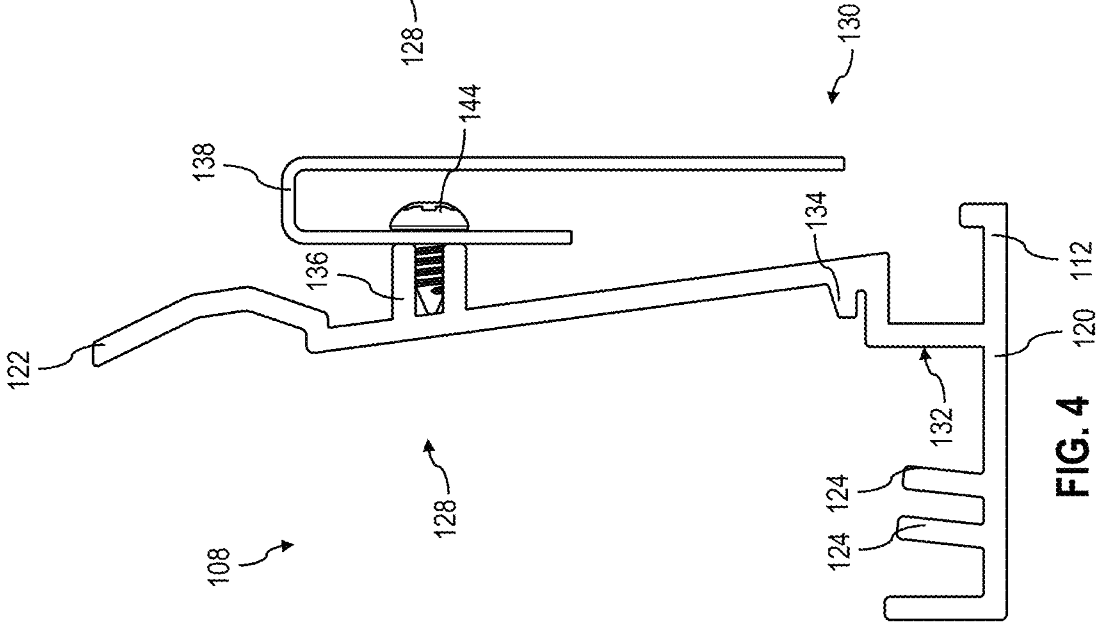
FIG. 4 illustrates a support frame of a light engine assembly of the light fixture of FIG. 1 according to embodiments.
Figure 6:
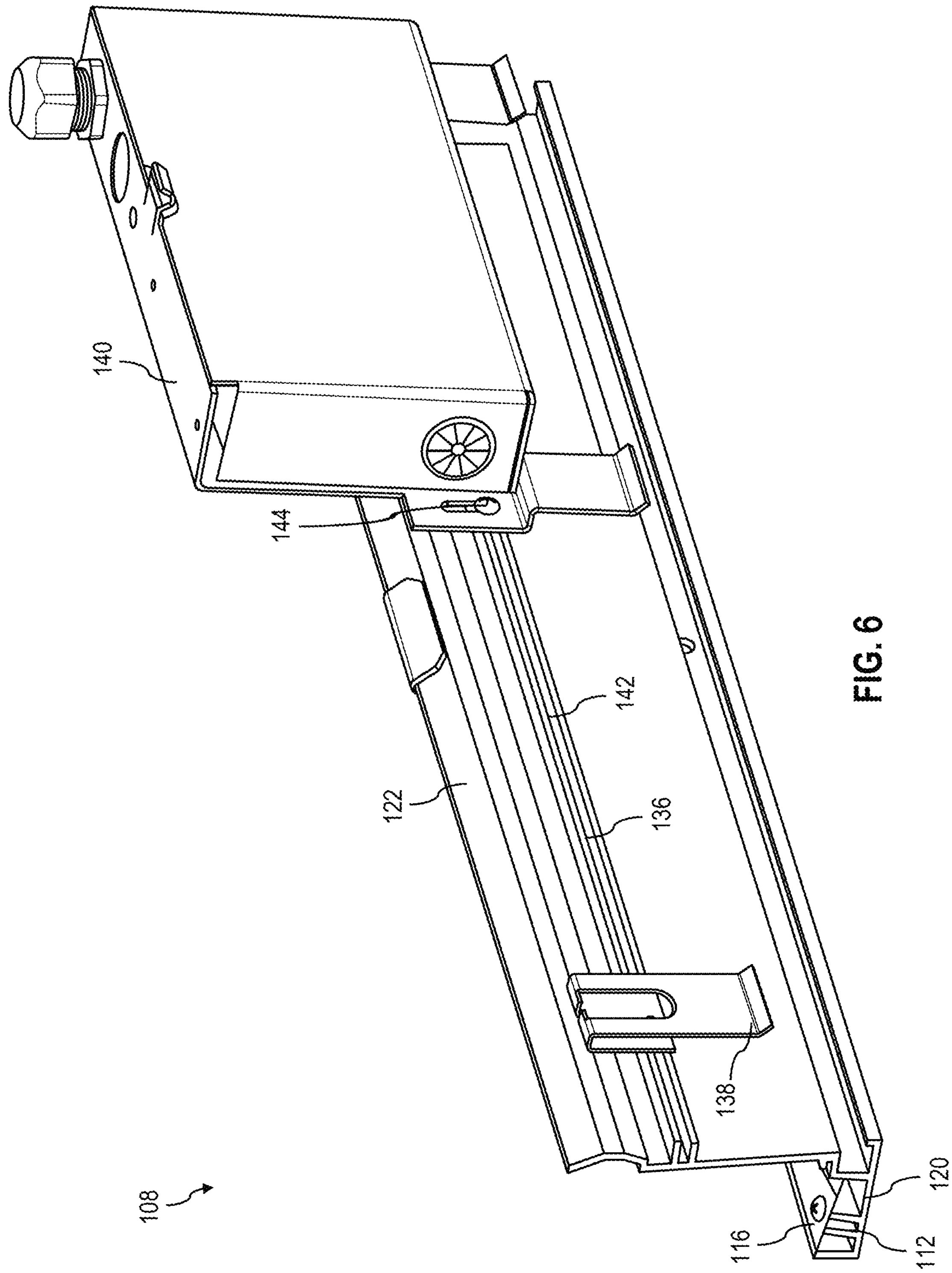
FIG. 6 illustrates the support frame and the reflector of the light engine assembly of FIG. 1.
Figure 7:
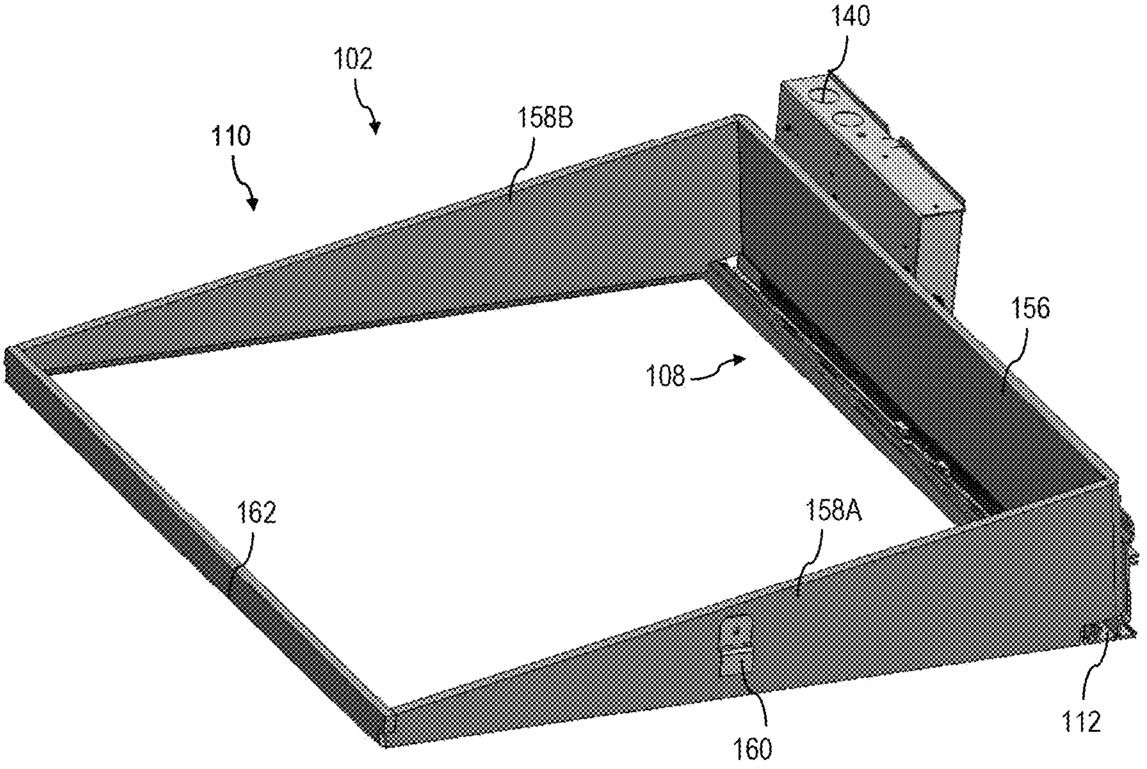
FIG. 7 illustrates the light fixture of FIG. 1 with a ceiling tile removed.

As best illustrated in FIGS. 4 and 5, the support member 112 of the light engine assembly 108 includes a base 120 and an upstanding wall 122 that extends upwardly from the base 120. One or more support arms 124 may also extend upwardly from the base 120. In embodiments with a plurality of support arms 124, the support arms 124 optionally may extend to different heights relative to the base 120. In such embodiments, and as discussed in detail below, the different heights of the support arms 124 may support the reflector 116 (or other optical component of the light engine 131) at an angle relative to a horizontal direction, which in turn may ensure that light emitted from the one or more light sources 114 is directed upwards (if so desired). The support member 112 may be formed of any material having suitable structural integrity and/or thermal management properties. Suitable materials may include, but are not limited to, polymeric or metallic (e.g., steel, aluminum, etc.) materials. The support member 112 may be formed using various methods, including, but not limited to, molding, extruding, casting, etc. In some embodiments, the support member 112 is formed from extruded aluminum. Referring to FIGS. 4 and 5, the upstanding wall 122 of the support member 112 includes a front side 128 and a back side 130. As illustrated in FIG. 4, for example, the front side 128 includes a vertical surface 132, and referring to FIG. 8, the light sources 114 (and/or other components of the light engine 131) may be supported on the vertical surface 132.

Referring back to FIGS. 4 and 5, in certain embodiments, the front side 128 of the upstanding wall 122 includes a support ledge 134 that extends outwardly from the upstanding wall 122 at a location above the vertical surface 132. As discussed in detail below, a portion of the wall assembly 110 may be at least partially supported on the support ledge 134.

The back side 130 of the upstanding wall 122 may include one or more mounting features 136 for supporting additional components on the support member 112, such as but not limited to mounting clips 138, an electronics box 140 (e.g., housing a driver and/or other electronic components of the light fixture 102), and/or other components as desired. In the embodiment illustrated, the mounting features 136 are mounting channels 142 that receive fasteners 144 (see FIG. 4) that attach the additional components to the upstanding wall 122; however, in other embodiments, other mounting features 136 may be provided on the upstanding wall 122 as desired.

As mentioned, the light engine 131 includes one or more light sources 114, which may include any suitable source of light, including but not limited to a light emitting diode (LED) 115, an organic LED (OLED), an incandescent bulb, combinations thereof, or other sources as desired. In various embodiments, the light engine includes a printed circuit board (PCB) 146, the light sources 114 are provided on the PCB 146, and the PCB 146 is supported on the vertical surface 132. Any number of light sources 114 may be provided on the PCB 146, and when a plurality of light sources 114 are included, the light sources 114 may be provided in various numbers, patterns, and/or arrangements on the PCB 146 as desired. The light sources 114 may emit light of different colors such that the ceiling tiles 106 illuminated by such colored light appear to “glow” with the color of the emitted light. Various suitable means or mechanisms may be used to support the components of the light engine 131 (e.g., the light sources 114 and/or PCB 146) on the vertical surface 132 such as but not limited to mechanical fasteners, adhesive tape, etc. In one non-limiting example, a double-sided, thermal adhesive tape may be used to support the PCB 146 with associated LEDs 115 on the vertical surface 132.

The optical components of the light engine 131 may be various devices and components that may direct light emitted from the one or more light sources 114. In the embodiment illustrated, the optical components of the light engine 131 include the reflector 116, which may have various shapes or profiles as desired. The reflector 116 may be constructed from various materials as desired suitable for receiving light emitted from the light sources 114 of the light engine 131 and redirecting it in a desired direction (e.g., upwards and outwards in the embodiment illustrated). In certain embodiments, the reflector 116 may be a specular reflector, optionally with a textured surface such as but not limited to peened, dimpled, and/or hammertone textures. In some non-limiting embodiments, the reflector 116 has a surface reflectivity between 90%-99.5%, inclusive, such as 92%-99%, inclusive, such as 94%-99%, inclusive, such as 96%-99%, inclusive, such as 98.5-99%, inclusive. In one embodiment, the reflector 116 (or at least the surface of the reflector 116 exposed to the light emitted from the light sources 114) may be formed of polished metals such as, but not limited to, polished aluminum. In some non-limiting examples, a reflective material for use in the reflector 116 may be a polished anodized aluminum sheet, such as Miro® reflective aluminum materials, available from Alanod-Solar GmbH & Co.

Figure 11:
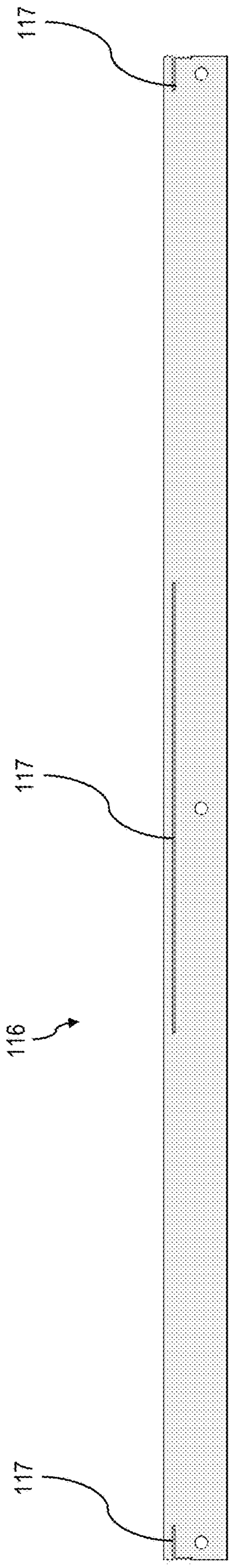
FIG. 11 illustrates the reflector of the light engine assembly of the light fixture of FIG. 1 according to embodiments.
Figure 12:
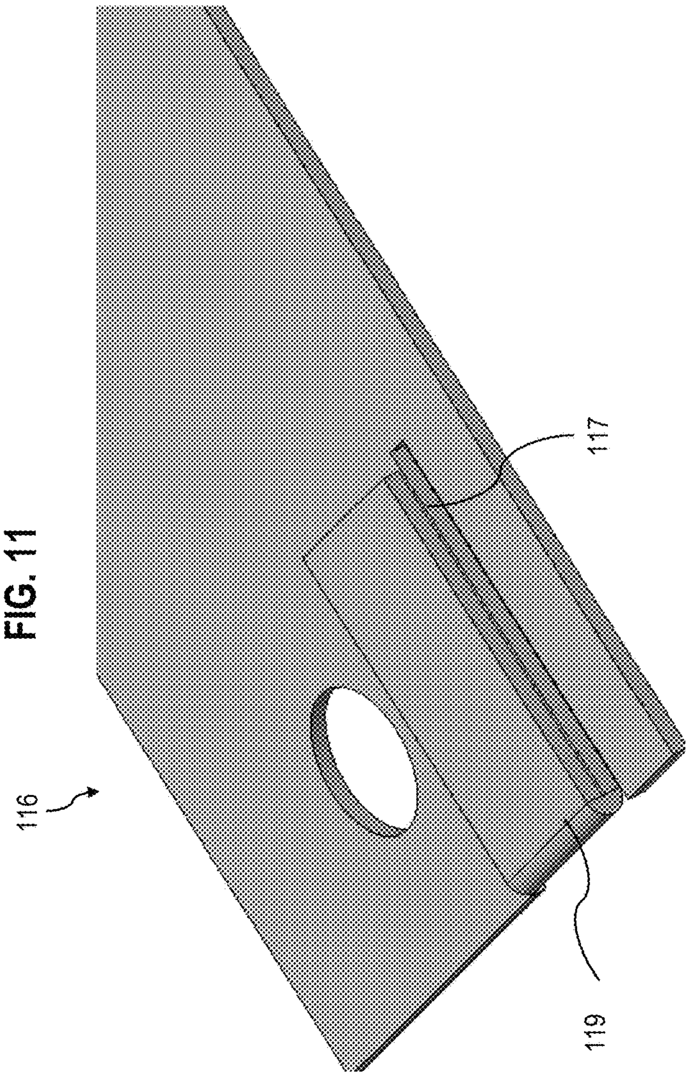
FIG. 12 illustrates a portion of the reflector of FIG. 11.

Referring to FIGS. 11 and 12, in some embodiments, the reflector 116 includes one or more notches or cutouts 117 for receiving portions of the lens 118. Engagement of the lens 118 with the reflector 116 may position the lens 118 as discussed in detail below. The reflector 116 optionally includes a reflector tab 119 (FIG. 12) that can be moved between an unfolded position and a folded position as illustrated in FIG. 12. In an unfolded position, the reflector tab 119 may extend outwards from the reflector 116. Optionally, in the unfolded position, the reflector tab 119 may be substantially coplanar with the reflector 116. In certain embodiments, the reflector tab 119 in the folded position may capture a portion of the lens 118 between the reflector tab 119 and the reflector 116 to further position the lens 118 relative to the reflector 116.

Figure 8:
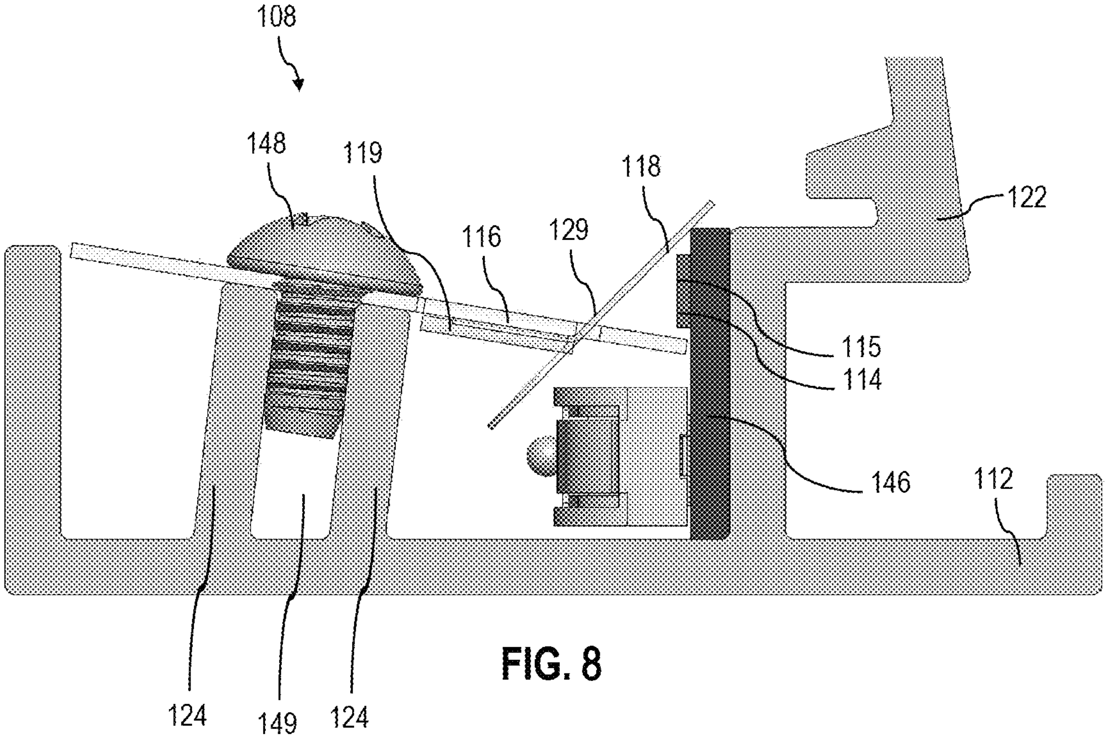
FIG. 8 illustrates a portion of the light engine assembly of the light fixture of FIG. 1.

As best illustrated in FIG. 8, when the light engine assembly 108 is assembled, the reflector 116 rests on the one or more support arms 124 and extends towards the upstanding wall 122 and more specifically toward the vertical surface 132 of the upstanding wall 122. In certain embodiments, the reflector 116 extends entirely (within acceptable tolerances) to the vertical surface 132 and/or to the PCB 146. As illustrated in FIG. 8, the reflector 116 extends towards the upstanding wall 122 such that the reflector 116 is at least partially positioned below the light sources 114 of the light engine 131 to redirect the light emitted therefrom.

In certain embodiments, the reflector 116 is angled downwards as it extends towards the upstanding wall 122, although it need not in other embodiments. For example, in the illustrated embodiment, the height of adjacent support arms 124 decreases along the base 120 towards the upstanding wall 122 such that the reflector 116 positioned atop the support arms 124 angles downwardly toward the upstanding arm 122. In such embodiments, the support arms 124 may support the reflector 116 at a shallow angle relative to base 120 and/or a horizontal axis, which may direct reflected light in a direction predominantly outwards towards a far end of the reflective tile 103 supported by the light fixture 102. In certain embodiments, the support arms 124 position an end of the reflector 116 distal the light engine 131 and/or light sources 114 approximately level with a highest lit portion of the lens 118 (see FIG. 13), such that the reflector 116 serves to cut off and redirect light that would otherwise be emitted directly downward into the space below. Again, however, any number of support arms 124 of any relative height may be used. Optionally, the reflector 116 may be secured to the support arms 124 using one or more fasteners 148 (see FIG. 8) and/or other suitable mechanisms as desired. In the illustrated embodiment, the fasteners 148 engage a channel 149 formed between adjacent support arms 124, but such is not a requirement.

Referring to FIGS. 8-10 and 13, in addition to and/or in place of the reflector 116, the optical components of the light engine may include the optional lens 118. When included, the lens 118 may be constructed from various materials as desired to control the appearance of and/or direct light emitted from the light sources 114 and may have various shapes or profiles as desired. The lens 118 is engaged with the reflector 116 and extends towards the upstanding wall 122 such that the reflector 116 and the lens 118 surround the light sources 114 of the light engine 131. The lens 118 and reflector 116 may be engaged with each other via slots, notches, fasteners, and/or as otherwise desired. Optionally, the lens 118 extends at least partially through the reflector 116. In embodiments with the lens 118, the lens 118 may help reduce color separation or hard cutoff lines from appearing on the reflective tile 103.

Figure 9:
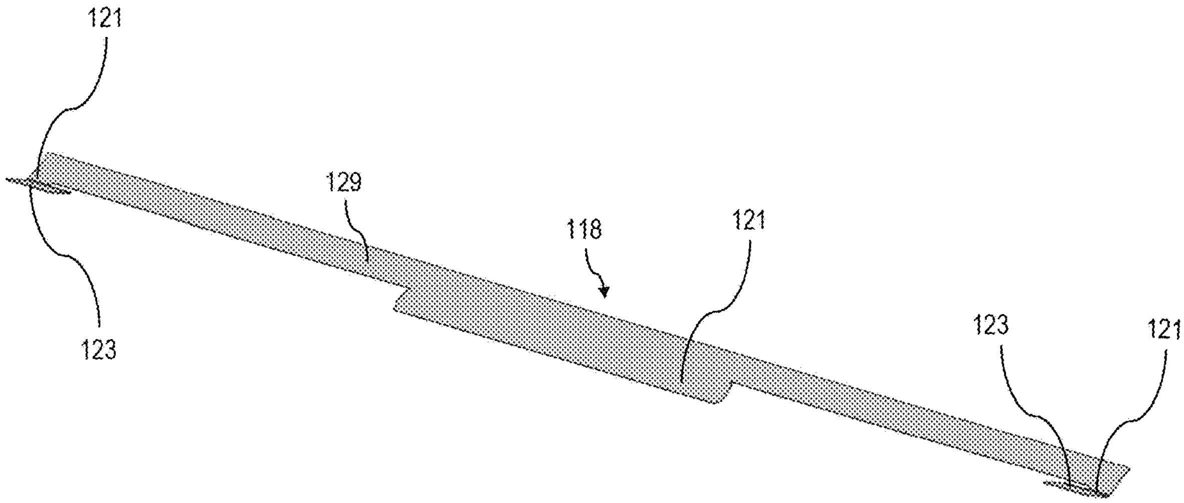
FIG. 9 illustrates a lens of the light engine assembly of the light fixture of FIG. 1 according to embodiments.
Figure 10:
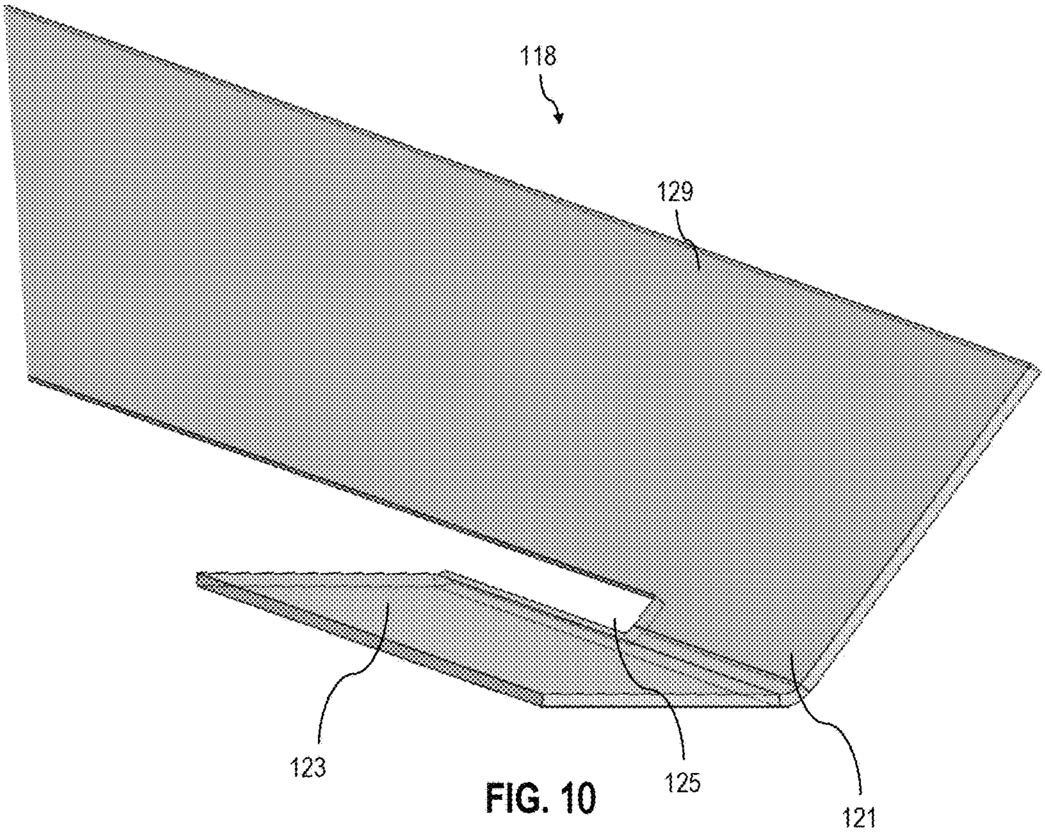
FIG. 10 illustrates a portion of the lens of FIG. 9.

Referring to FIGS. 9 and 10, in some embodiments, the lens 118 includes a lens body 129 and one or more extensions 121 that extend from the lens body 129 Three extensions 121 are illustrated in FIGS. 9 and 10—two extensions 121 at the opposing edges and one extension 121 centrally located on the lens 118—but any number of extensions 121 could be provided. In certain embodiments, and as best illustrated in FIG. 10, extensions 121 at the opposing ends of the lens 118 may include lens tabs 123 that extend outward from the extensions 121. In various embodiments, the lens tabs 123 extend at an angle relative to the extensions 121, and in one non-limiting embodiment the lens tabs 123 may extend at oblique angles relative to the extensions 121. As illustrated in FIG. 10, the lens tabs 123 define optional notches 125 between the lens tabs 123 and the lens 118. The lens tabs 123 may facilitate positioning of the lens 118 relative to the reflector 116 such that the lens 118 is at least partially (and in the illustrated embodiment, entirely) supported by the reflector 116. In one embodiment, the extensions 121 at opposing edges of lens 118 are received in notches 117 provided on the opposing edges of the reflector 116 and the extension 121 located centrally on the lens 118 is received within notch 117 located centrally on the reflector 116. When so positioned, the lens tabs 123 lie substantially flush against the underside of the reflector 116. The reflector tabs 119 are folded over the lens tabs 123 to capture the lens tabs 123 and help lock the lens 118 in position on the reflector 116 to limit or prevent angular, lateral, and/or longitudinal relative movement between the lens 118 and reflector 116. In this way, the desired position of the lens 118 relative to the light sources 114 is maintained.

Figure 13:
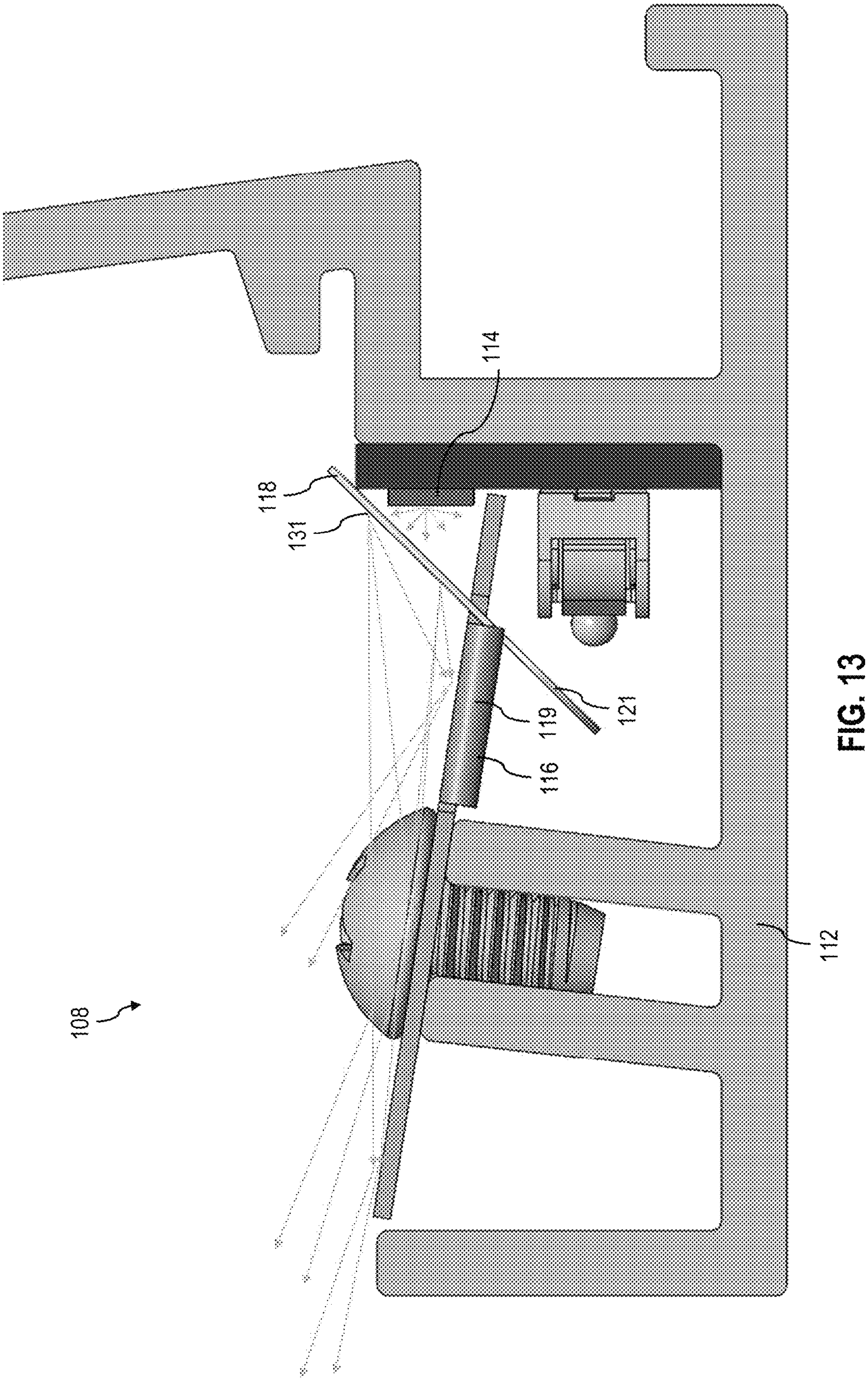
FIG. 13 illustrates a portion of the light engine assembly of the light fixture of FIG. 1 and light emitted from a light source.

Referring to FIGS. 8 and 13, in certain embodiments, the lens body 129 extends above the light sources 114 of the light engine 131 to direct light emitted from the light engine 131 generally upwards and/or outwards towards the reflector 116, and/or preferentially toward the more distal portions of the reflective tile 103. In certain embodiments, and as illustrated in FIG. 10, the edges of the lens 118 distal the reflector rests against the PCB 146, but such may not always be the case. In some embodiments, the lens 118 may be entirely supported due to engagement with the reflector 116, although it need not be in other embodiments. Such a configuration may further facilitate assembly of the light fixture 102. The lenses 118 illustrated should not be considered limiting, and in other embodiments a lens may have other shapes or profiles as desired.

FIG. 13 illustrates how light emitted from the light sources 114 of the light engine 131 (that otherwise would be directed downward) is reflected upward according to embodiments, with the light represented by the arrows in FIG. 13. As mentioned, in some embodiments, the reflector 116 is supported at a shallow angle, and optionally an end of the reflector 116 distal the light sources 114 may be approximately level (within tolerances) with a highest lit portion 133 of the lens 118 and/or approximately level (within tolerances) and/or at a vertical position higher than a vertical position of the light sources 114. In this embodiment and as illustrated by the arrows in FIG. 13, such positioning of the reflector 116 may help ensure that the light emitted through the lens 118 and toward the reflector 116 is reflected at least once and in a direction that is generally upwards and/or outwards (e.g., towards the reflective tile 103 supported by the light fixture 102). Such positioning may ensure no direct brightness or direct downlighting from the optical system can be seen from the space below the ceiling. Such positioning may further conceal the light engine assembly 108 and/or the light engine 131 from below the light fixture 102 when the light fixture 102 is installed in a ceiling grid system, thereby improving aesthetics of the light fixture 102 compared to some traditional light fixtures.

As best illustrated in FIGS. 3, 7, 14A-C, and 15A-B, the wall assembly 110 of the light fixture 102 includes a back wall 156 and side walls 158A-B extending away from the back wall 156. In certain embodiments, the side walls 158A-B may decrease in height as they extend away from the back wall 156 such that the reflective tile 103 supported on the wall assembly 110 is angled downwards relative to the back wall 156. However, such is not a requirement.

In some embodiments, the back wall 156 and side walls 158A-B are monolithically formed, although they need not be in other embodiments. In certain cases, the back wall 156 and side walls 158A-B are constructed from an acoustic-absorbing material such as but not limited to polyethylene terephthalate felt, fabric, wood, foam, plasterboard, fiberglass, combinations, thereof, and/or other acoustic materials as desired. Optionally, the wall assembly 110 includes a trim wall 162 that may extend along a grid section 104 opposite from the back wall 156 when the light fixture 102 is assembled. In certain embodiments, the trim wall 162 may keep the wall assembly 110 locked and/or otherwise maintained in the unfolded configuration. The trim wall 162 may be constructed from a material that is the same as or different from the material used for the back wall 156 and/or the side walls 158A-B. In certain embodiments, the trim wall 162 may be formed integrally or separately from back wall 156 and/or side walls 158A-B.

Figure 14A:
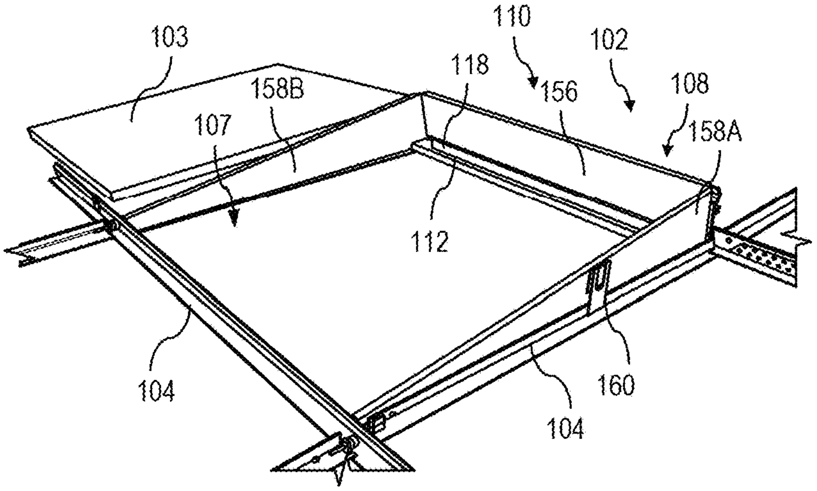
FIGS. 14A-C illustrate steps of assembling the light fixture of FIG. 1 with the ceiling grid system of FIG. 1 according to embodiments.
Figure 14B:
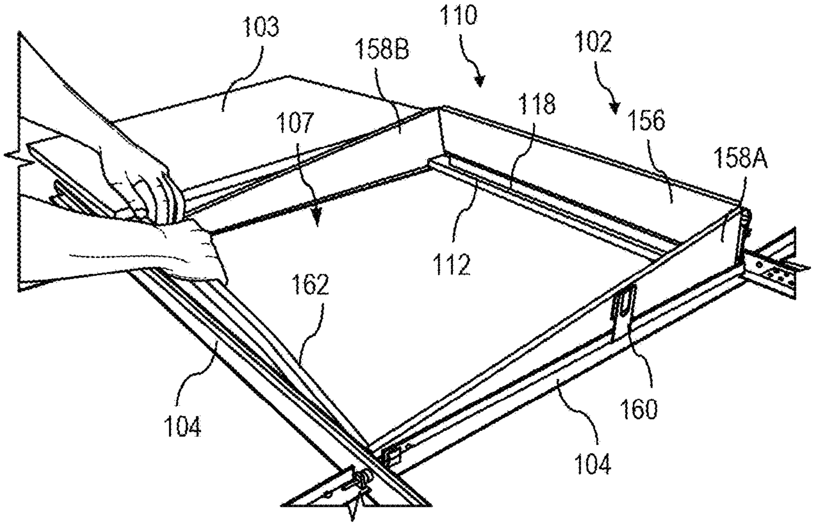
Figure 15A:
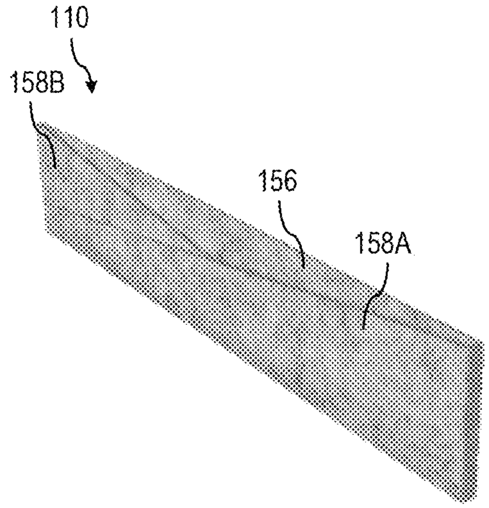
FIGS. 15A-B illustrate a wall assembly of the light fixture of FIG. 1 according to embodiments.
Figure 15B:
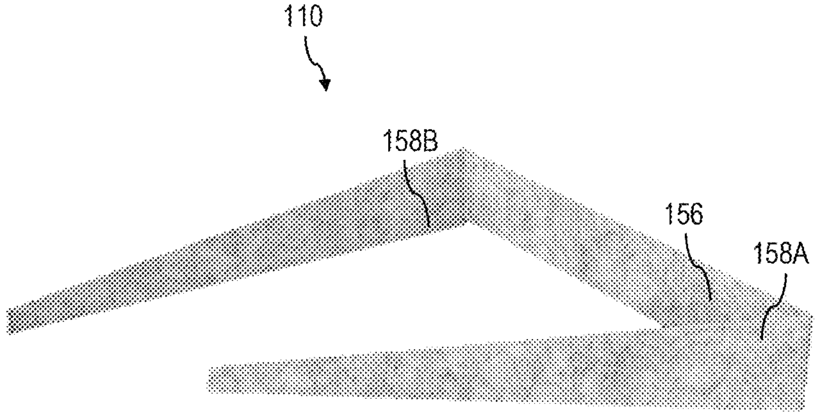

Referring to FIGS. 15A-B, in various embodiments, the wall assembly 110 is configurable between a folded configuration (FIG. 15A) and a partially expanded configuration (FIG. 15B). FIGS. 14A-B illustrates the wall assembly 110 in a fully expanded configuration. Adjustability of the wall assembly 110 between the folded configuration and the expanded configuration may provide improved transport and/or shipping with a reduced footprint (e.g., in the folded configuration) while allowing for an easy, tool-less installation into the expanded configuration.

The wall assembly 110 may include mounting features such as but not limited to clips 160 for supporting the wall assembly 110 within the ceiling grid openings 107. In the embodiment illustrated, the clips 160 of the side walls 158A-B extend over the distal ends of the vertical grid walls 111 of opposing grid sections 104 forming a ceiling grid opening 107, and the clip 160 of the back wall 156 engages the upstanding wall 122 of the light engine assembly 108.

Figure 14C:
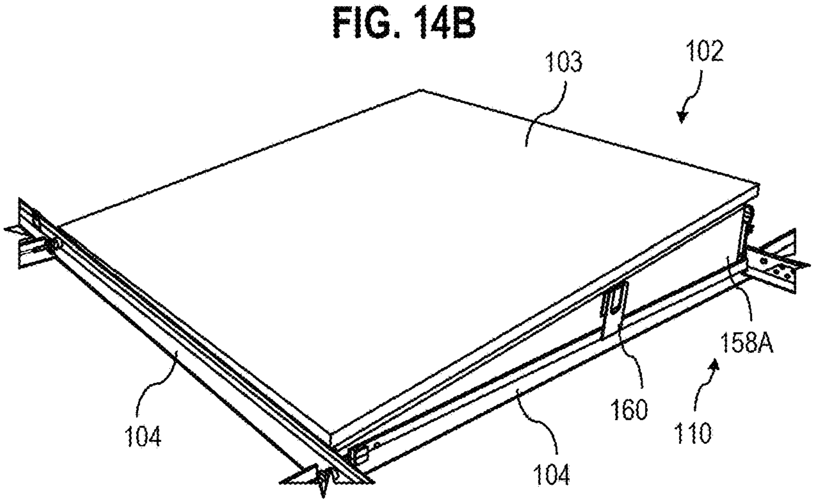

Referring to FIGS. 14A-C, a method of installing the light fixture 102 on the grid system 100 is illustrated. Referring to FIG. 14A, the method includes mounting the light engine assembly 108 on one of the grid sections 104. Mounting the light engine assembly 108 may include seating the base 120 of the support member 112 on a lateral grid flange 113 of the grid section 104. Mounting the light engine assembly 108 includes positioning the mounting clips 138 over the top of the vertical grid wall 111 of the grid section 104 such that the light engine assembly 108 is entirely supported by the grid section 104. The electronics box 140 may be supported on the upstanding wall 122 before or after supporting the light engine assembly 108 on the grid section 104. In certain embodiments, the light engine assembly 108 may be fully supported within an opening 107 defined by the grid sections 104.

The method includes adjusting the wall assembly 110 from the folded configuration to the expanded configuration. Optionally, adjusting the wall assembly 110 includes unfolding the side walls 158A-B relative to the back wall 156 such that the side walls 158A-B extend outwardly from the back wall 156. The back wall 156 of the wall assembly 110 may be supported on the light engine assembly 108 by positioning the back wall 156 on the support ledge 134 and/or by positioning the clip 160 of the back wall 156 over the top of the upstanding wall 122. The side walls 158A-B may be supported by positioning the clips 160 of the side walls 158A-B over the top of the vertical grid walls 111 of the opposing grid sections 104 extending adjacent to the grid section 104 supporting the light engine assembly 108.

Referring to FIG. 14B, the trim wall 162 may be supported by a grid section 104 that is opposite from the grid section 104 supporting the light engine assembly 108. Referring to FIG. 14C, the reflective tile 103 is positioned so as to rest atop and be supported by the top of the wall assembly 110. Optionally, similar to the wall assembly 110, the reflective tile 103 may be constructed from a sound-absorbing material, which may be the same as or different from the material used for the wall assembly 110. In other embodiments, the reflective tile 103 need not be sound absorbing.

As illustrated in FIG. 14C, the reflective tile 103 may be angled downwards due to the decreasing heights of the side walls 158A-B as they extend away from the back wall 156. In various embodiments, when the light fixture 102 is installed, the reflector 116 may be a first reflector that reflects light emitted from the light source away the ceiling grid opening 107, and the reflective tile 103 supported on top of the wall assembly 110 may be a second reflector the light fixture 102 and redirecting the light that was initially reflected upwards and away from the ceiling grid opening 107.

Figure 16:
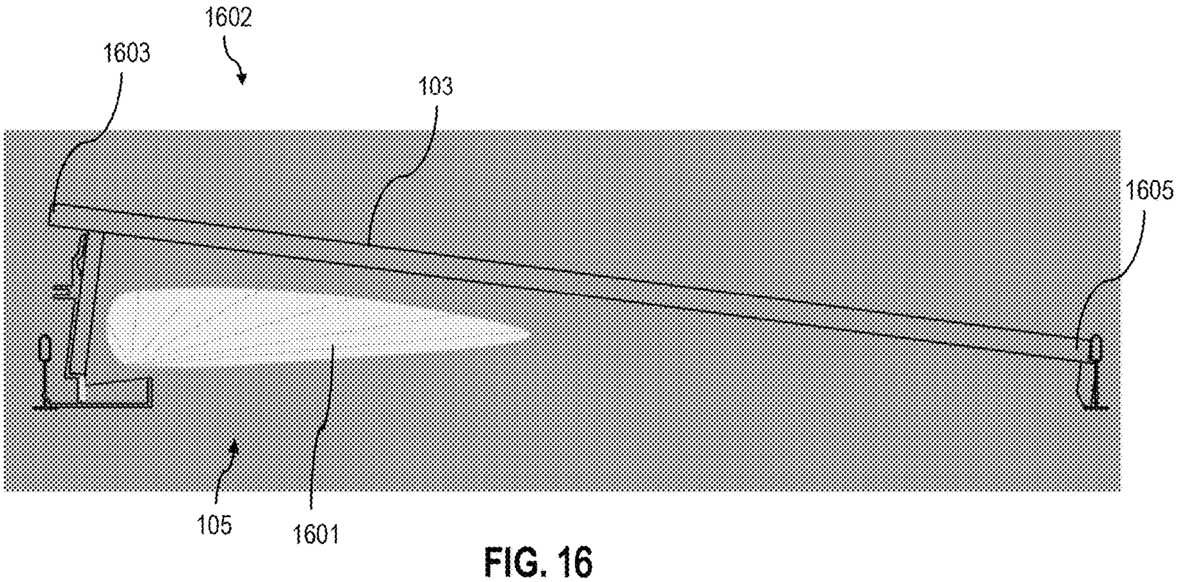
FIG. 16 illustrates light output from a light engine assembly of a light fixture according to embodiments.

FIG. 16 schematically illustrates light output 1601 from a light engine of a light fixture 1602 that is substantially similar to the light fixture 102 and light engine 131. As illustrated in FIG. 16, light 1601 is directed upwards and outwards to illuminate the reflective tile 103 supported by the light fixture 1602 and such that the luminous area 105 is defined on the reflective tile 103. In certain embodiments, the light output 1601 is an asymmetric "batwing" output, which may more uniformly light the reflective tile 103 by minimizing luminous intensity directed upward toward the near end 1603 of the reflective tile 103 and maximizing luminous intensity directed outward toward the far end 1605 of the reflective tile 103.

Figure 17:
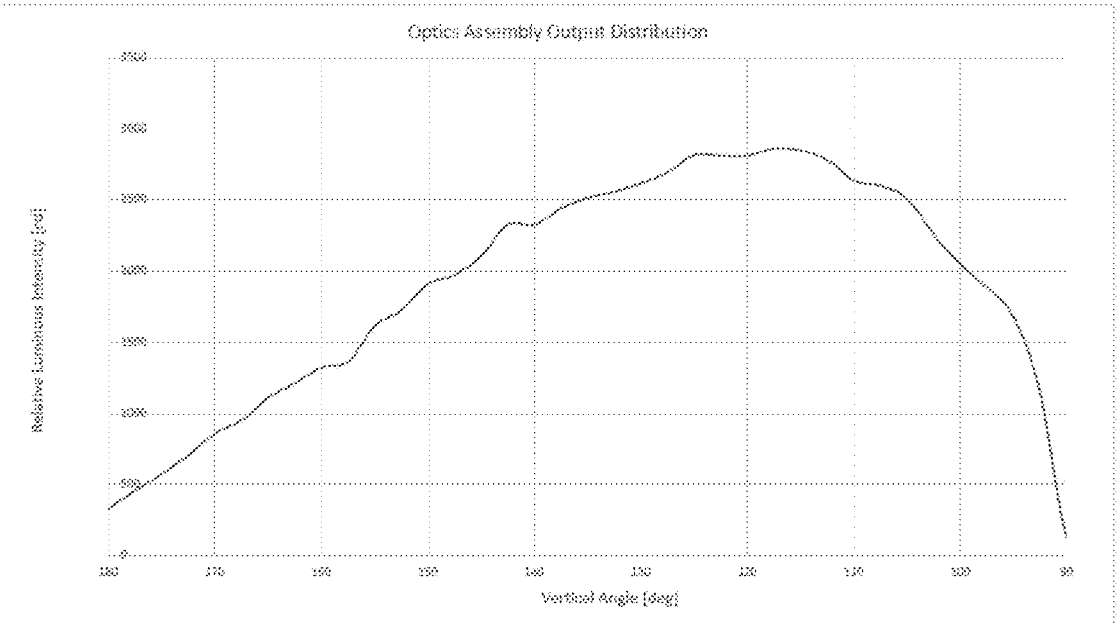
FIG. 17 is a graph of light output from the light engine assembly of the light fixture of FIG. 16.

FIG. 17 is a luminous intensity graph of the light output of the light engine of the light fixture 1602 according to embodiments. As represented by the graph, very little light is directed directly upwardly toward the near end 1603 of the reflective tile 103 (see the 90° vertical angle). Rather, the emitted light is cast outwardly toward the far end 1605 of the reflective tile 103, which is represented by the increased luminous intensity with movement from the 90° vertical angle toward the 180° vertical angle. The luminous intensity graph illustrates how luminous intensity is minimized toward the near end of the tile and maximized in a direction moving toward the far end of the tile, which may more uniformly light the tile.

Figure 18:
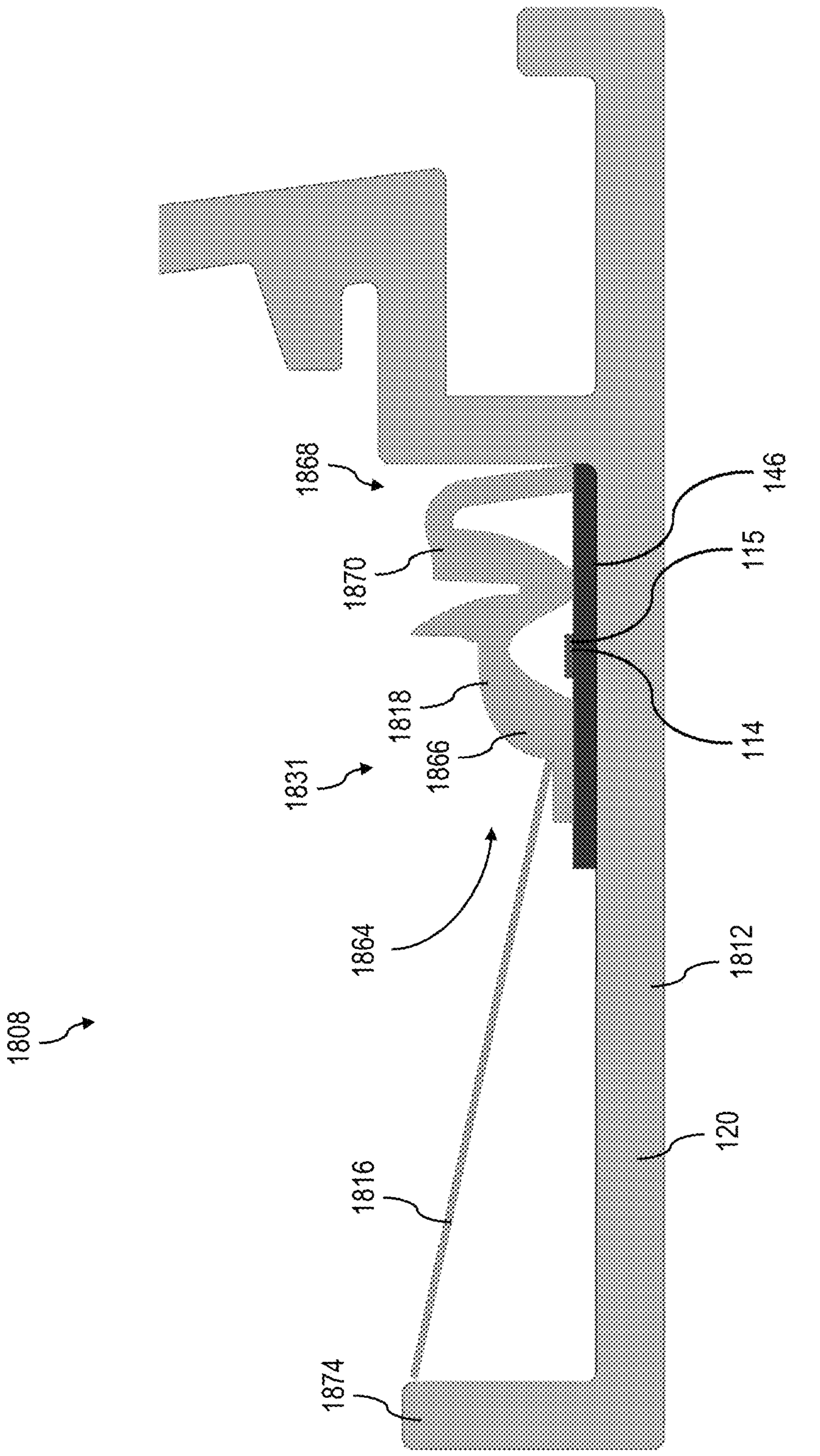
FIG. 18 illustrates a portion of a light engine assembly for a light fixture according to embodiments.

FIG. 18 illustrates an example of a light engine assembly 1808 according to embodiments. The light engine assembly 1808 is similar to the light engine assembly 108 and includes a support member 1812 and a light engine 1831. The support member 1812 is substantially similar to the support member 112 except that the support member 1812 omits the one or more support arms 124, and the light sources 114 are supported on the base 120 of the support member 1812.

Figure 19:
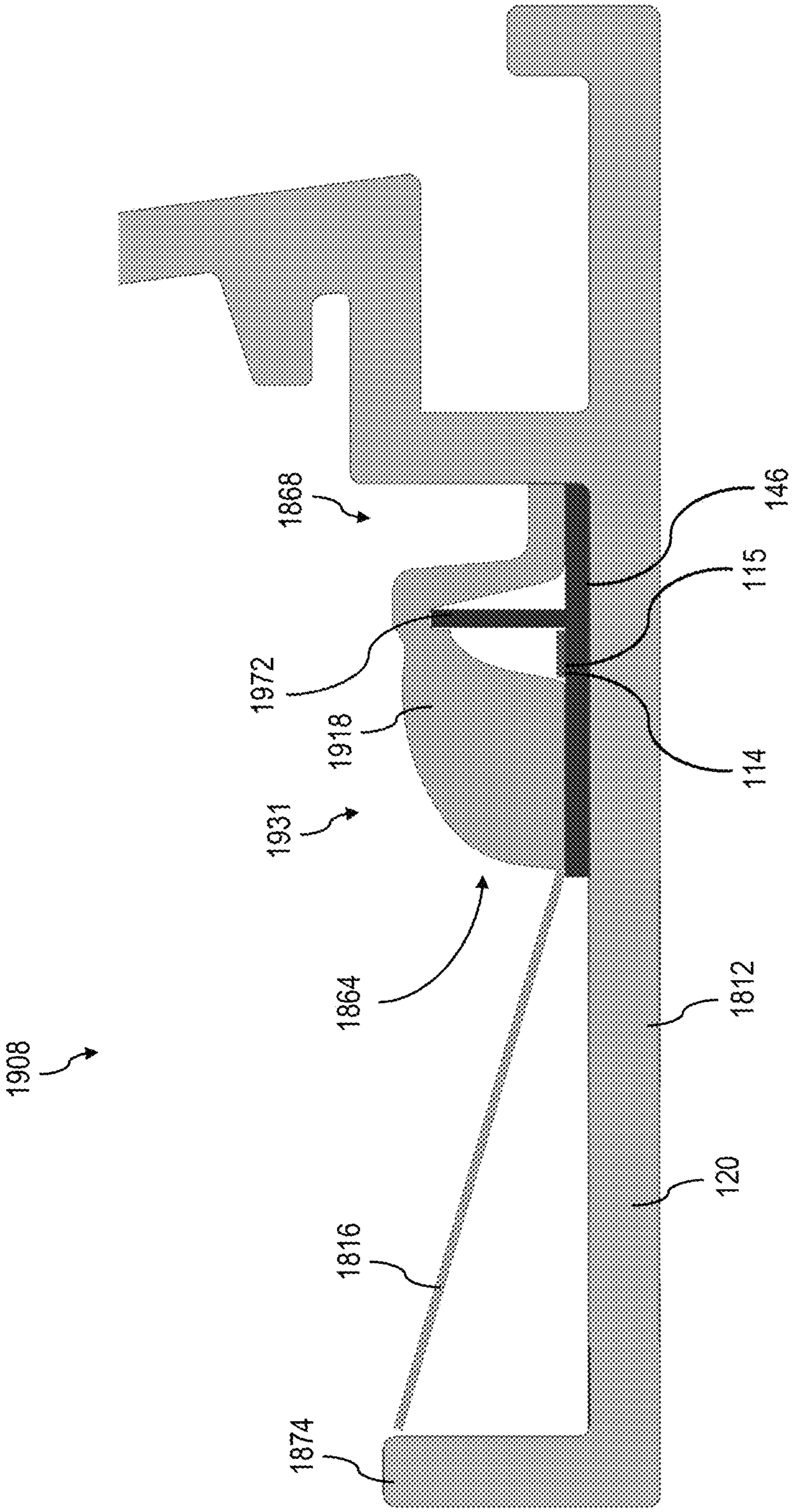
FIG. 19 illustrates a portion of a light engine assembly for a light fixture according to embodiments.

Compared to the light engine 131, the optical components of the light engine 1831 include a lens 1818 and optionally a reflector 1816. In the embodiment illustrated in FIG. 18, the lens 1818 includes a first side 1864 having a first portion 1866 of the lens 1818 and a second side 1868 having a second portion 1870 of the lens 1818. The first portion 1866 and the second portion 1870 may be integrally formed or formed separately and subsequently attached to each other. The first portion 1866 is generally designed to receive light rays from the light sources 114 and refract or otherwise emit the light rays in a direction toward the first side 1864 of the lens 1818. The second portion 1870 may be designed to reflect and refract light that is initially emitted from the light sources 114 toward the second side 1868 of the lens 1818 back toward the first side 1864 of the lens 1818. In some embodiments, the second portion 1870 may include one or more total internal reflection (TIR) surfaces that reflect light rays and direct them out of the second portion 1870 of the lens 1818 and toward the first side 1864 of the lens 1818. However, the lens 1818 may have any geometry and is not limited to the specific geometry shown in FIG. 18. FIG. 19 illustrates a non-limiting example of a lens 1918 with a different geometry compared to the lens 1818. In certain embodiments, a ledge or arm 1874 of the base 120 of the support member 1812 (and optionally the reflector 1816 when included) may be approximately level with a highest lit portion of the lens 1818 such that the base 120 serves to cut off and redirect light that would otherwise be emitted directly downward into the space below.

When included, the reflector 1816 may be provided at various orientations relative to the lens 1818. Optionally, and as illustrated in FIG. 18, the reflector 1818 may rest on the lens 1818. When the reflector 1816 is included, the reflector 1816 may facilitate the directing of light emitted from the light sources 114 to provide the desired distribution. When the reflector 1816 is omitted, the lens 1818 itself may provide the desired distribution (e.g., asymmetric batwing distribution) without requiring the reflector 1816. In other words, the light engine 131 illustrates a non-limiting example for a reflective-based approach providing the asymmetric batwing distribution, and the light engine 1831 illustrates a non-limiting example of a refractive-based approach for providing the asymmetric batwing distribution.

As mentioned, the lens 1818 of the light engine 1831 may help ensure that the light emitted is directed in a direction that is generally upwards and/or outwards. Such positioning of the lens 1818 may ensure no direct brightness or direct downlighting from the optical system can be seen from the space below the ceiling. Such positioning may further conceal the light engine 1831 from below the light fixture when the light fixture with the light engine 1831 is installed in a ceiling grid system, thereby improving aesthetics of the light fixture compared to some traditional light fixtures.

FIG. 19 is another example of a light engine assembly that utilizes a refractive based approach to achieve a desired light distribution. As shown, the light engine assembly 1908 includes many of the same elements as the light engine assembly 1808. Such elements are not re-described in the interest of brevity. Light engine assembly 1908 differs from light engine assembly 1808 in that a light engine 1931 includes a lens 1918 having a different geometry compared to the lens 1818. The lens 1918 also includes a mirror structure 1972 to reflect light that is initially emitted from the light sources 114 toward the second side 1868 of the lens 1918 back toward the first side 1864 of the lens 1918.

The various aspects, embodiments, implementations or features of the described embodiments can be used separately or in any combination. In particular, it should be appreciated that the various elements of concepts from the figures may be combined without departing from the spirit or scope of the invention.

The use of the terms "a" and "an" and "the" and similar referents in the context of describing the invention (especially in the context of the following claims) are to be construed to cover both the singular and the plural, unless otherwise indicated herein or clearly contradicted by context. Directional references such as "up," "down," "top," "bottom," "left," "right," "front," and "back," among others, are intended to refer to the orientation as illustrated and described in the figure (or figures) to which the components and directions are referencing. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, or gradients thereof, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, the nearness of completion will be so as to have the same overall result as if absolute and total completion were obtained.

Preferred embodiments of this invention are described herein, including the best mode known to the inventors for carrying out the invention. The invention is susceptible to various modifications and alternative constructions, and certain shown exemplary embodiments thereof are shown in the drawings and have been described above in detail. Variations of those preferred embodiments, within the spirit of the present invention, may become apparent to those of ordinary skill in the art upon reading the foregoing description. The inventors expect skilled artisans to employ such variations as appropriate, and the inventors intend for the invention to be practiced otherwise than as specifically described herein. Accordingly, it should be understood that there is no intention to limit the invention to the specific form or forms disclosed, but on the contrary, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

That which is claimed:

1. A lighting system for a ceiling grid opening defined by a plurality of grid edges, the lighting system comprising a light fixture, the light fixture comprising a light engine assembly, the light engine assembly comprising:

a support member configured to be supported along one of the plurality of grid edges, the support member comprising:

a base; and an upstanding wall extending upwardly from the base, the upstanding wall comprising a vertical surface; and a light engine comprising:

a light source provided on the vertical surface of the upstanding wall of the support member; and at least one optical element configured to redirect at least a portion of the light from the light source, wherein the at least one optical element of the light engine comprises a reflector, wherein the light engine is configured to emit light away from the ceiling grid opening such that a relative luminous intensity of light directed in a vertical direction is less than a relatively luminous intensity of light directed at an angle relative to the vertical direction.

2. The lighting system of claim 1, wherein the at least one optical element is on the support member.

3. The lighting system of claim 1, wherein the reflector is a first reflector, wherein the lighting system further comprises a second reflector covering the light fixture and adapted to redirect the light initially reflected away from the ceiling grid opening.

4. The lighting system of claim 3, wherein the light fixture further comprises:

a wall assembly comprising a back wall and two side walls extending from the back wall, each side wall decreasing in height as the side wall extends away from the back wall, wherein the support member supports the back wall of the wall assembly, and wherein the wall assembly is configured to support the second reflector.

5. The lighting system of claim 3, wherein the second reflector is planar ceiling tile.

6. A lighting system for a ceiling grid opening defined by a plurality of grid edges, the lighting system comprising a light fixture comprising a light engine assembly, the light engine assembly comprising:

a support member configured to be supported along one of the plurality of grid edges, the support member comprising a base and an upstanding wall extending upwardly from the base, the upstanding wall comprising a vertical surface; and a light engine supported on the support member, the light engine comprising a light source provided on vertical surface of the upstanding wall of the support member and a reflector extending below the light source, wherein an end of the reflector distal from the light source is level with or above a vertical position of the light source.

7. The lighting system of claim 6, further comprising an upstanding wall extending upwardly from the support member, wherein the upstanding wall further comprises a vertical surface and a support ledge above the vertical surface, wherein the light source is supported on the vertical surface, and wherein the support ledge is configured to support a vertically-extending wall of a wall assembly of the light fixture.

8. The lighting system of claim 6, wherein the light engine is configured to emit light away from the ceiling grid opening in an asymmetric, batwing distribution such that no emitted light from the light engine is directed directly downwardly from the light engine through the ceiling grid opening.

9. The lighting system of claim 6, wherein the reflector is a first reflector, wherein the lighting system further comprises a second reflector covering the light fixture and adapted to redirect light initially reflected away from the ceiling grid opening.

10. A lighting system for a ceiling grid opening defined by a plurality of grid edges, the lighting system comprising a light fixture comprising:

a support member configured to be supported along one of the plurality of grid edges, wherein the support member comprises:

a base;

an upstanding wall extending upwardly from the base; and an arm extending upwardly from the base; and a light engine comprising:

a light source provided on the base of the support member between the arm and the upstanding wall; and at least one optical element to redirect at least a portion of the light from the light source, wherein the light engine is configured to emit light away from the ceiling grid opening such that no emitted light from the light engine is directed directly downwardly from the light engine through the ceiling grid opening.

11. The lighting system of claim 10, wherein the optical element of the light engine comprises a lens for modifying the light emitted by the light source with a refractive-based distribution.

12. The lighting system of claim 10, wherein the optical element comprises a lens, and wherein the arm of the support is level with or above a highest lit portion of the lens.

13. The lighting system of claim 10, wherein optical element comprises a lens, and wherein the light engine further comprises a reflector resting on the lens and configured to redirect light from the light source.

14. The lighting system of claim 10, wherein optical element comprises a lens and a reflector within the lens.

15. The lighting system of claim 14, wherein the reflector is configured to reflect light initially emitted from the light source toward a first side of the lens back towards a second side of the lens.

16. The lighting system of claim 14, wherein the reflector is within an optical cavity of the lens with the light source.

17. The lighting system of claim 10, wherein optical element comprises a lens with one or more total internal reflection surfaces.

18. The lighting system of claim 10, wherein the arm of the base is an innermost portion of the support relative to the grid opening.

19. The lighting system of claim 10, wherein at least one optical element comprises a reflector covering the light fixture and adapted to redirect the light initially reflected away from the ceiling grid opening.

20. The lighting system of claim 19, wherein the reflector is planar ceiling tile.

* * * * *